Aug. 1, 1961
K. EISELE
2,994,192
ANNULAR COMBUSTION CHAMBER WITH ROTARY
ATOMIZATION OF THE INJECTED FUEL
Filed July 27, 1956
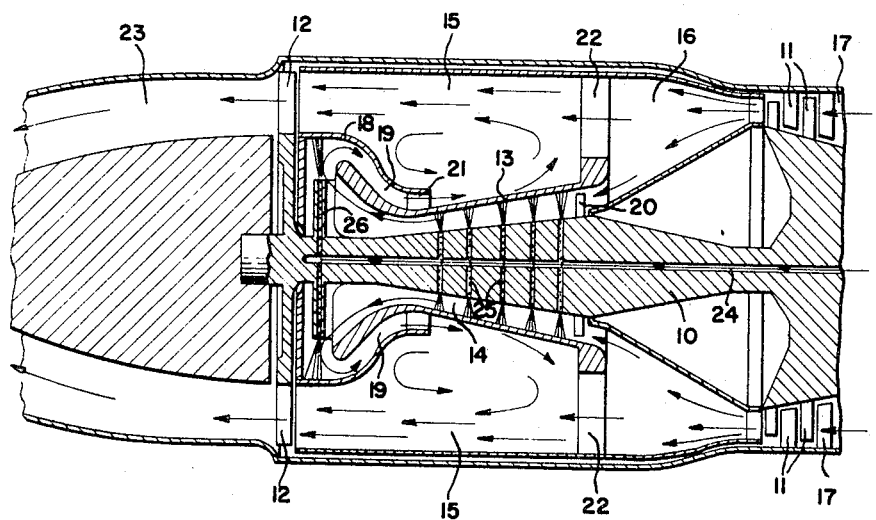
INVENTOR
KARL EISELE
BY *Dicke and Craig.*
ATTORNEYS United States Patent Office 2,994,192
Patented Aug. 1, 1961

2,994,192
ANNULAR COMBUSTION CHAMBER WITH ROTARY ATOMIZATION OF THE INJECTED FUEL
Karl Eisele, Fellbach, near Stuttgart, Germany, assignor to Daimler-Benz Aktiengesellschaft, Stuttgart-Unterturkheim, Germany
Filed July 27, 1956, Ser. No. 600,522
Claims priority, application Germany July 30, 1955
14 Claims. (Cl. 60—35.6)

The present invention relates to improvements in annularly-shaped combustion chambers of gas turbines or jet engines and consists essentially in that the fuel subjected to turbulence by the rotary atomization during injection thereof is supplied or fed into the combustion air in this state of turbulence, and more particularly in that the primary combustion air and/or the secondary combustion air prior to mixing thereof with the fuel are set into rotation. The mixing of the primary air and of the secondary air takes place, for example, in such a manner that the mixture of primary combustion air and of fuel which is subjected to turbulence is fed with a rotary movement into the secondary combustion air in a direction axially opposite to the movement of the latter as well as preferably tangentially thereto, as viewed in a cross section of the combustion chamber.

Such a construction in accordance with the present invention offers, inter alia, the advantage that any possibly unburned fuel particles which rebound from the combustion chamber wall are thereby thrown back against the hot combustion chamber wall. This results in a significant saving in fuel as the injected fuel is completely burned.

Accordingly, it is an object of the present invention to provide an improved annularly-shaped combustion chamber for gas turbines or jet engines.

Another object of the present invention resides in the provision of an arrangement of the combustion chamber and of the means for introducing the primary and secondary combustion air as well as the means for injecting the fuel so as to provide a thorough mixing of the fuel and therewith improved combustion efficiency.

Still another object of the present invention is the provision of such a combustion chamber arrangement and means for supplying the combustion air and fuel as to assure complete burning of all the fuel particles which results in considerable saving in fuel.

Still another object of the present invention is the provision of a simple and effective means for spreading and atomizing the fuel within the combustion chamber which assures thorough mixing with the primary combustion air, and for thereupon mixing this premixed fuel-air mixture with the secondary or main combustion air.

Another object of the present invention resides in the provision of means for supplying the primary and secondary combustion air to the combustion chamber of a gas turbine or jet engine in such a manner as to introduce the primary combustion air, which had been premixed with the fuel, in a direction opposite to the axial flow of the secondary combustion air and tangential thereto so as to assure a high degree of turbulence and therewith an intimate thorough mixing of the entire fuel-air mixture.

According to another feature of the present invention the fuel is appropriately sprayed or injected against the walls of an annular channel or space around which the combustion gases flow thereby heating these walls. In such a manner a thrice-effective preparation of the fuel is achieved, namely: a fine atomization of the fuel during the inlet or entry thereof into the annular channel or space, the evaporation of the fuel within this annular channel or space and a throw-back by centrifugation against the hot combustion chamber walls of those fuel particles which possibly may not have been completely evaporated or gasified.

Further objects, features and advantages of the present invention will become more obvious from the following description when taken in connection with the accompanying drawing which shows for purposes of illustration only one embodiment in accordance with the present invention, and wherein the single figure is an axial, longitudinal cross sectional view through a combustion chamber arrangement of a gas turbine or jet engine in accordance with the present invention.

In a practical constructive embodiment according to the present invention these features and objects are realized preferably in such a manner that the fuel is supplied through the rotating turbine rotor, while the rotor which itself is provided on the outside thereof with discharge passages or apertures for the fuel, is surrounded by an annular channel or passage through which the primary combustion air flows, and wherein this annular channel or passage in turn is surrounded by the combustion chamber into which the primary and secondary combustion air are introduced in opposite directions.

By means of the use of this counter-flow principle in connection with the introduction of the primary and secondary air into the combustion chamber, an intimate turbulence and thorough mixing of the primary air containing the fuel with the secondary or main combustion air is achieved.

The primary and/or secondary air are appropriately subjected to rotation, for example, by means of appropriate guide vanes. Such guide vanes are appropriately provided also ahead of the exit or discharge place of the primary air from the annular channel or passage, namely at a place prior to mixing of the primary air with the secondary air. In order to increase the effectiveness, a set of guide vanes may be arranged on the turbine rotor which is placed ahead of the annular channel or passage through which the primary air flows.

The annular channel or passage which, shortly ahead of the tangential discharge thereof into the combustion chamber is reversed or bent back upon itself by essentially 180 degrees, serves as evaporator while the fuel may also be injected at the place where the annular channel is bent back or also into the evaporator itself.

The supply of primary or secondary air into the annular channel and evaporator as well as into the combustion chamber appropriately takes place by means of a common annularly-shaped diffusor.

Referring now more particularly to the drawing which shows a longitudinal cross section through an embodiment in accordance with the present invention, reference numeral 10 designates a rotor which is journalled in the gas turbine or jet engine in any suitable manner, for example, at both ends thereof. The rotor 10 carries the rotor vanes of the compressor 11 as well as the turbine vanes 12. A wall 13 which surrounds the rotor 10 at a distance therefrom forms an annular channel or passage 14 and separates the same from the annularly-shaped combustion chamber 15. The annular channel or passage 14 and the combustion chamber 15 are in communication with the supply or feed of combustion air in the compressor 11 by means of a common annularly-shaped diffuser 16, on the one hand, and by means of an evaporator 19 formed by the wall 13 and the further wall 18 with each other, on the other hand. The evaporator 19 at the same time constitutes the nozzle-shaped end portion of the annular channel or passage 14 which is reversed or bent back upon itself by approximately 180 degrees and terminates or discharges into the combustion chamber 15 essentially tangentially as seen in a cross sectional view of the combustion chamber. The walls 13 and 18 which have outwardly facing surfaces defining the inner wall of the combustion chamber 15 are each stationary and supported in any suitable manner in the turbine apparatus.

The wall 13 is formed by two generally conical portions, the first of which tapers rearwardly of the engine and surrounds a tapering portion of the rotor in such a manner that the cross-sectional area of the channel 14 along this first conical portion of the wall 13 is of reducing cross section in the direction of air flow therethrough. The rearward end of the wall 13 is another generally conical portion which tapers in the opposite direction and forms with the rotor a gradually increasing cross-sectional area of the channel 14. The forwardly tapering wall 18 which encircles the rearward conical portion of the wall 13 defines with the outer wall of the combustion chamber an annular discharge channel of restricted cross section as compared with the cross sectional dimensions of the forward parts of the combustion chamber.

Guide vanes 20 for the primary combustion air are provided at the entrance or inlet into the annular channel or passage 14. Further guide vanes 21 are provided at the exit or discharge of the annular channel or passage 14 or of the evaporator 19 formed by the nozzle or venturi-shaped end portion thereof. These guide vanes 20 and 21 as well as the guide vanes 22 for the secondary or main combustion air are preferably provided with inclined or helically shaped blades or vanes in order to impart a rotary movement to the air. The combustion chamber 15 is in communication with the jet nozzle 23 through the turbine 12.

The fuel is supplied through an axial bore 24 in the rotor 10 and is injected through individual radial cross bores 25 which discharge outwardly into the annular channel or passage 14 or against the wall 13 which delimits the channel or passage 14 toward the outside thereof as well as through one of several nozzle bores or jets 26 which discharge into the bent-back portion of the annular passage 14 or into the evaporator 19, for example, against the outer wall 18 thereof.

The air which enters at 17 is compressed by the compressor 11, thereupon reduces its speed in the diffuser 16 and at the same time is subdivided into the primary air portion and the secondary air portion. The primary air portion is set into rapid rotary movement by means of the guide vanes 20 which rotate with the rotor 10 and thereupon flows through the annular channel or passage 14.

The fuel which is injected into the annular space or passage 14 through the axial bore 24 where, for example, it may be preheated and through the cross bores 25 with the aid of centrifugal forces developed by the rotation of the shaft 10, is subjected to turbulence as a result of the rotation of the rotor, on the one hand, and as a result of the rotary movement of the primary air, on the other, and evaporates upon impinging on the wall 13 which is heated by the combustion gases in the combustion chamber 15.

The fuel air mixture in the annular channel 14 is thereupon conducted, after subsequent enrichment with fuel 26 through discharge nozzles, into the combustion chamber 15 over the nozzle-shaped evaporator 19 whereby the thus enriched fuel air mixture enters the combustion chamber 15 essentially tangentially through the guide vanes 21 and is admixed to the secondary air, which generally flows in the opposite direction and which is preferably set into rotary movement as a result of the guide vanes 22, so that a further turbulence takes place and the combustion takes place thereafter. Both the primary and secondary combustion air, though flowing in axially opposite directions rotate in the same direction.

Any fuel particles which remain unburned during the combustion process and which rebound from the walls of the annular passage or channel 14 or of the combustion chamber 15 are thrown back against these walls by reason of the rotary movement of the primary or secondary air respectively and are thereupon also burned.

The hot combustion gases flow through the turbine 12 which is connected with the rotor 10 and thereby set the rotor into rapid rotary movement, whereupon the combustion gases leave through the jet nozzle 23 into the atmosphere and thereby produce the propulsion.

While I have shown and described one preferred embodiment in accordance with the present invention, it is understood that the same is not limited thereto but is susceptible of many changes and modifications within the spirit of the invention, and I intend to cover all such changes and modifications except as defined by the appended claims.

I claim:

1. An annular combustion chamber for gas turbines or jet engines having wall means disposed to at least partially define the inside wall of said annular combustion chamber and comprising means including said wall means for defining a channel for supplying a primary combustion air stream admixed with fuel into said combustion chamber, said channel being located radially inwardly of the inside wall of said combustion chamber and extending axially essentially the whole length of said combustion chamber, injection means for injecting fuel into said primary air stream against said wall means, said injection means comprising a plurality of fuel discharge means located at axially spaced points over essentially the entire length of said wall means, said wall means being heated by the combustion gases in the combustion chamber to produce evaporation of the impinging fuel from said discharge means along the entire length of said channel and therewith to enhance the formation of a fuel-air mixture, and means for feeding said fuel-air mixture into said combustion chamber, said combustion chamber including further means for supplying thereto secondary combustion air, said two last-mentioned means being so constructed and arranged that said fuel-air mixture and said secondary combustion air are turbulently intermixed in the combustion area of said combustion chamber.

2. A combustion chamber according to claim 1, wherein said wall means is an essentially relatively stationary structure and further including rotor means generally coaxial with said annular combustion chamber, said discharge means being rotatable with said rotor means for centrifugally spraying fuel against said wall means, said rotor means defining an inner wall of said channel, said channel having gradually reducing cross-sectional area over a first axially extending portion thereof in the direction of flow of said primary combustion air stream and a second portion of increasing cross-sectional area downstream of said first portion of reducing cross-sectional area.

3. An annular combustion chamber for gas turbines or jet engines having a rotor and a stationary wall defining an outwardly facing inner wall portion of said combustion chamber, said wall being radially spaced around said rotor and at least partially defining a channel formed at least in part by said wall and said rotor, means for supplying a primary combustion air stream into said channel, means for feeding fuel through said rotor, said rotor including nozzle means rotating therewith for injecting said fuel into said channel against said wall for rotary atomization of the fuel into said primary air stream, said wall being so constructed and arranged as to be heated by the heat generated in the combustion chamber to produce evaporation of the fuel impinging on said wall and therewith to enhance the formation of a fuel-air mixture, means for supplying secondary combustion air to said combustion chamber, and means for feeding said fuel-air mixture into said combustion chamber for admixture with the secondary combustion air, said last-mentioned means including a further wall encircling one end of said first-mentioned wall and cooperating therewith to define a reversely directed terminal portion of said channel arranged to supply said fuel-air mixture to said combustion chamber in a direction essentially opposite with respect to the direction of admission of secondary combustion air to the combustion chamber.

4. An annular combustion chamber according to claim 3 wherein said walls are so constructed and arranged that the channel for said fuel-air mixture reverses itself at a location adjacent the discharge end of said combustion chamber.

5. A combustion chamber according to claim 1 wherein said fuel-air mixture and said secondary air are fed into said main combustion chamber in axially opposite directions, said fuel-air mixture entering into said combustion chamber at essentially the longitudinal center thereof.

6. A combustion chamber according to claim 4, wherein said primary and secondary air are set into rotation in the same rotary direction, and wherein said fuel-air mixture is supplied to said combustion chamber in a direction essentially opposite to said secondary air and tangentially thereto.

7. An annular combustion chamber for gas turbines or jet engines with a rotor and a wall encircling said rotor and extending axially to define an inner wall portion of said combustion chamber comprising means for supplying a primary combustion air stream into the channel formed by said wall and the outer surface of said rotor, means for injecting fuel into said primary air stream against said wall at a plurality of places disposed behind one another in the direction of flow of said air stream, said wall being heated by the gases in the combustion chamber to produce evaporation of the impinging fuel and therewith to enhance the formation of fuel-air mixture, and means for feeding said fuel-air mixture into said main combustion chamber with the admixture of secondary combustion air in such a manner that said fuel-air mixture is being fed into said main combustion chamber in an axially opposite direction to said secondary air.

8. An annular combustion chamber for gas turbines or jet engines with a rotor and a wall encircling said rotor and extending axially to define an inner wall portion of said combustion chamber comprising means for supplying a primary combustion air stream into the channel formed by said wall and the outer surface of said rotor, means for injecting fuel into said primary air stream against said wall, said wall being heated by the gases in the combustion chamber to produce evaporation of the impinging fuel and therewith to enhance the formation of fuel-air mixture, means including a bent end portion of venturi-like nozzle shape of said channel forming an evaporator for feeding said fuel-air mixture into said main combustion chamber, and means for supplying secondary combustion air to said combustion chamber for admixture with said fuel-air mixture and to supply said fuel-air mixture to said combustion chamber in a direction essentially opposite to said secondary air.

9. A combustion chamber according to claim 8, further comprising rotary means for injecting additional fuel into said bent end portion to enrich the fuel-air mixture in said evaporator.

10. An annular combustion chamber for gas turbines or jet engines having a rotor and comprising a stationary wall encircling said rotor and extending axially to define an inner wall portion of said annular combustion chamber and at least partially defining a channel extending approximately the length of said combustion chamber, said channel being formed at least in part by said wall and said rotor, means for supplying a primary combustion air stream into the channel, means rotating with said rotor and defining fuel conducting apertures therein for injecting fuel into said primary air stream against said wall, said wall being so constructed and arranged as to be heated by the heat generated in the combustion chamber to produce evaporation of the fuel impinging on said wall and therewith to enhance the formation of a fuel-air mixture, means for supplying secondary combustion air to said combustion chamber, and means including a further wall encircling and extending a substantial axial distance over one end of said first-mentioned wall and cooperating therewith to define a reversely directed portion of said channel for feeding said fuel-air mixture into said combustion chamber for admixture with the secondary combustion air in such a manner that said fuel-air mixture is being fed into said combustion chamber in an axially opposite direction to said secondary air.

11. A combustion chamber according to claim 10 comprising means for imparting a rotary movement in the same rotary direction to said primary air and to said secondary air, said first-mentioned means including a set of guide vanes on said rotor located at the inlet of said channel, said last-mentioned means further including a set of guide vanes located at the discharge end of said channel and a compressor located at the inlet of said combustion chamber, said first-mentioned guide vanes and said compressor being connected with said rotor for common rotation therewith.

12. A combustion chamber according to claim 2, wherein said wall means includes a first wall encircling said rotor means and having a first generally conical portion tapering in the direction of flow of said primary combustion air stream to reduce the cross-sectional areas of said channel and a second generally conical portion tapering in the direction opposite the taper of said first portion, said wall means including a further wall encircling said second generally conical portion and lying between said second portion and the combustion chamber, an outer generally annular wall enclosing said wall means and defining the outer wall of said combustion chamber, said further wall cooperating with said second wall portion to define a reversely directed terminal portion of said channel arranged to discharge the fuel-air mixture from said channel upon the outer surface of said first conical portion of said wall means and against said secondary air stream, said further wall cooperating with said outer wall of the combustion chamber to define a restricted annular discharge channel for combustion products from said combustion chamber.

13. A combustion chamber according to claim 12, wherein said fuel discharge means includes means for discharging fuel against said second wall portion.

14. An annular combustion chamber for gas turbines or jet engines having wall means disposed to at least partially define the inside wall of said annular combustion chamber and an outer generally annular wall enclosing said wall means and defining the outer wall of said combustion chamber, comprising means including a rotor means and said wall means for defining a channel for supplying a primary combustion air stream admixed with fuel into said combustion chamber, said channel being located radially inwardly of the inside wall of said combustion chamber and extending axially essentially the whole length of said combustion chamber, said wall means including a wall encircling said rotor means and having a first generally conical portion tapering in the direction of flow of said primary combustion air stream to reduce the cross-sectional area of said channel and a second generally conical portion tapering in the direction opposite the taper of said first portion, said wall means including a further wall encircling said second generally conical portion and lying between said second portion and the combustion chamber, said further wall cooperating with said second wall portion to define a reversely directed terminal portion of said channel, radial injection means within said wall means for injecting fuel into said primary air stream in said channel against said wall means along a substantial length thereof, said wall means being heated by the combustion gases in the combustion chamber to produce evaporation of the fuel from said injection means along said channel and therewith to enhance the formation of a fuel-air mixture, said combustion chamber including further means for supplying thereto secondary combustion air, said reversely directed terminal portion of said channel being oriented to direct the discharge of the fuel-air mixture from said channel over the outer surface of said first conical wall portion against said secondary combustion air supply to provide turbulent intermixing of said fuel-air mixture and said secondary combustion air in the combustion area of said combustion chamber, said further wall cooperating with said outer wall of the combustion chamber to define a restricted annular discharge channel for combustion products from said combustion chamber.

References Cited in the file of this patent

UNITED STATES PATENTS

| | | |
|---|---|---|
| 2,397,658 | Goddard | Apr. 2, 1946 |
| 2,416,389 | Heppner et al. | Feb. 25, 1947 |
| 2,547,959 | Miller | Apr. 10, 1951 |
| 2,552,851 | Gist | May 15, 1951 |
| 2,646,664 | Meschino | July 28, 1953 |
| 2,680,951 | Winter et al. | June 15, 1954 |
| 2,793,496 | Mortimer | May 28, 1957 |

FOREIGN PATENTS

| | | |
|---|---|---|
| 951,942 | France | Apr. 25, 1949 |